United States Patent
Aguilar et al.

(10) Patent No.: US 8,214,317 B2
(45) Date of Patent: Jul. 3, 2012

(54) FAILURE DETECTION SYSTEM RISK REDUCTION ASSESSMENT

(75) Inventors: Robert B. Aguilar, West Hills, NV (US); Zhaofeng Huang, Beverly Hills, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 421 days.

(21) Appl. No.: 12/542,241

(22) Filed: Aug. 17, 2009

(65) Prior Publication Data

US 2011/0040719 A1 Feb. 17, 2011

(51) Int. Cl.
*G06F 9/44* (2006.01)
*G06F 11/00* (2006.01)

(52) U.S. Cl. .......................................... 706/52; 714/100
(58) Field of Classification Search .................. None
See application file for complete search history.

(56) References Cited

U.S. PATENT DOCUMENTS

| | | | |
|---|---|---|---|
| 4,509,110 A | 4/1985 | Levesque, Jr. et al. | |
| 5,353,381 A | 10/1994 | Hamilton et al. | |
| 5,522,014 A | 5/1996 | Clark et al. | |
| 5,537,644 A | 7/1996 | Hamilton et al. | |
| 5,631,857 A | 5/1997 | Kobrosly et al. | |
| 6,006,197 A | 12/1999 | d'Eon et al. | |
| 6,311,166 B1 * | 10/2001 | Nado et al. | 705/30 |
| 6,624,078 B1 | 9/2003 | Ravkin | |
| 6,802,031 B2 | 10/2004 | Floyd et al. | |
| 7,159,198 B1 | 1/2007 | Ip et al. | |
| 2011/0010130 A1 * | 1/2011 | Hadden et al. | 702/181 |

OTHER PUBLICATIONS

Cornford, et al., "Design and Development Assessment", Aug. 6, 2002.*
Goto, et al., Network Intrusion and Failure Detection system with Statistical Analyses of Packet Headers, May 2005.*
Kunio Goto and Koji Kojima, "Network Intrusion and Failure Detection System with Statistical Analyses of Packet Headers", Proceedings of the 18th Int'l Conference on Systems and Engineering, 2005.
Cornford, et al, "Design and Development Assessment", IEEE 0-7695-0884-7, Aug. 6, 2002.

* cited by examiner

*Primary Examiner* — Alan Chen
(74) *Attorney, Agent, or Firm* — Carlson Gaskey & Olds P.C.

(57) ABSTRACT

A process includes determining a probability of a failure mode of a system being analyzed reaching a failure limit as a function of time to failure limit, determining a probability of a mitigation of the failure mode as a function of a time to failure limit, and quantifying a risk reduction based on the probability of the failure mode reaching the failure limit and the probability of the mitigation.

17 Claims, 3 Drawing Sheets

ALL FAILURES OCCUR IN 0.6 SECONDS

20% OF FAILURES OCCUR IN 0.4 SEC.
30% OF FAILURES OCCUR IN 0.7 SEC.
50% OF FAILURES OCCUR IN 1.2 SEC.
SUM OF ALL PERCENTAGES = 100%

CONTINUOUS DISTRIBUTION
SKEWED TO FAST FAILURES.

FAILURE DETECTION SYSTEM RISK REDUCTION ASSESSMENT

This application was made with government support under Contract No. NNM06AB13C awarded by NASA. The Government may therefore have certain rights in this invention.

BACKGROUND OF THE INVENTION

This application relates to failure detection systems, and more particularly to a method for determining the risk reduction of a given failure detection system.

A failure detection system ("FDS") may be used to identify failure signatures (e.g. a loss of engine coolant) indicative of failure modes (e.g. a radiator leak) in the hope that identification of the signature can prevent the failure mode from causing a failure limit (e.g. engine reaching temperature at which engine block will crack).

SUMMARY OF THE INVENTION

A process includes determining a probability of a failure mode of a system being analyzed reaching a failure limit as a function of time to failure limit, determining a probability of a mitigation of the failure mode as a function of a time to failure limit, and quantifying a risk reduction based on the probability of the failure mode reaching the failure limit and the probability of the mitigation.

A computer-implemented system includes a storage module and a microprocessor. The storage module stores at least one failure mode and at least one failure signature for a system being analyzed. The microprocessor is operable to determine a probability of the at least one failure mode of the system being analyzed reaching a failure limit as a function of time to failure limit, determine a probability of a mitigation of the failure mode as a function of a time to failure limit, and quantify a risk reduction based on the probability of the failure mode reaching the failure limit and the probability of the mitigation.

These and other features of the present invention can be best understood from the following specification and drawings, the following of which is a brief description.

DETAILED DESCRIPTION OF THE PREFERRED EMBODIMENT

Figure 1:
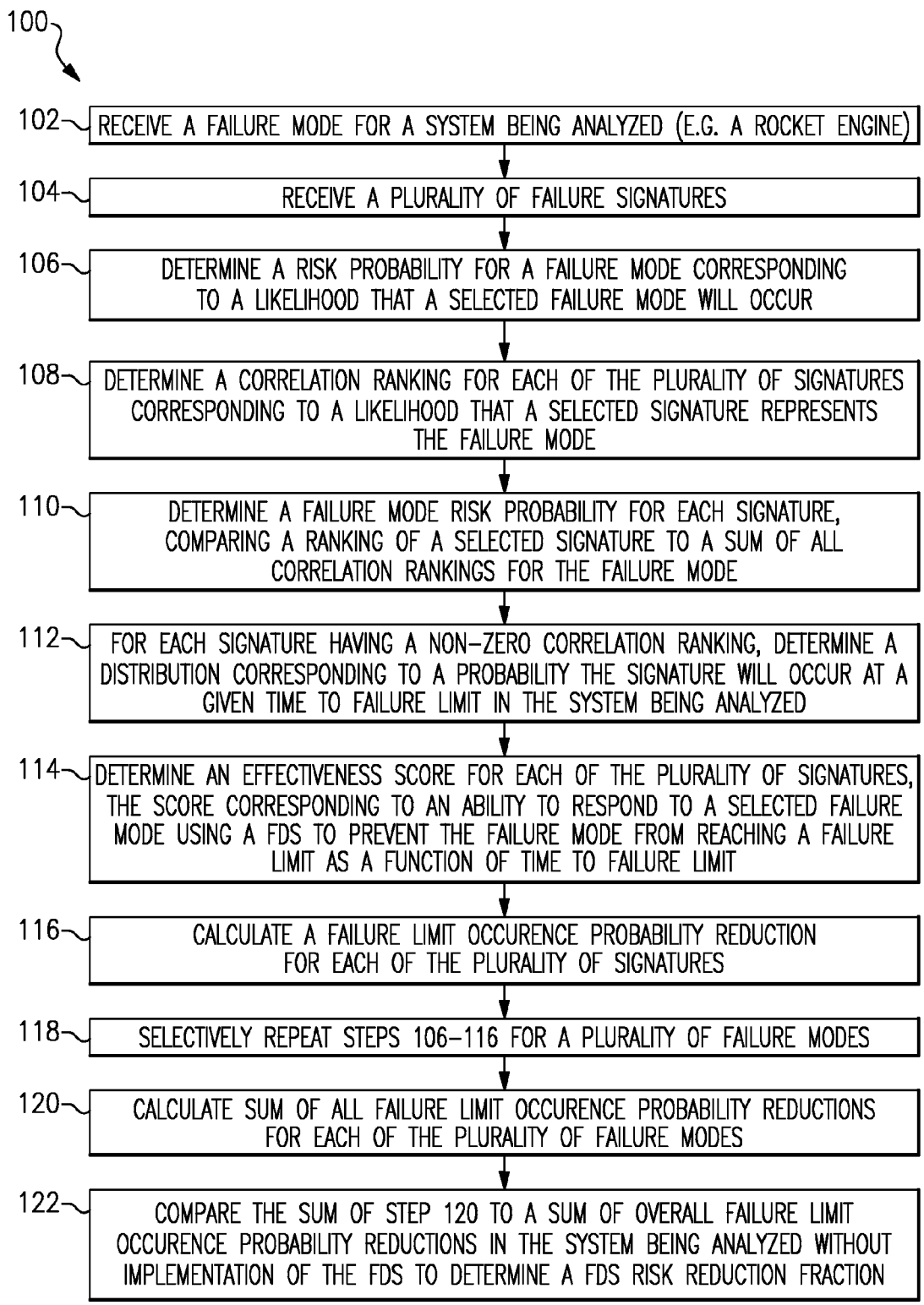
FIG. 1 schematically illustrates a method of determining a risk reduction of a failure detection system.

A failure detection system ("FDS") seeks to predict or provide notification of failures, to give a system operator an opportunity to prevent the occurrence of a failure limit in a system being analyzed (e.g., aircraft, automobile, welding process, etc.). Using the example of an automobile, a FDS could be, for example, a simple engine warning light, or a temperature gauge. A more primitive FDS could correspond to simply performing a manual inspection of a structure, such as a vehicle. As another example, a FDS may correspond to a Health and usage Monitoring System ("HUMS") used to monitor the health of critical components of a vehicle, such as a rocket, and used to collect operational flight data utilizing on-board accelerometers, sensors, and avionic systems. One example of a HUMS FDS is the Advanced Health Management System ("AHMS"). A system being analyzed may have no FDS, such that a failure mode is simply allowed to follow its natural course which may or may not lead to a failure limit.

In a given system, there may be a plurality of failure modes. A failure mode is a characteristic manner by which a failure occurs. A failure mode may represent a specific way in which a system, device or process (e.g., aircraft, automobile, welding process, etc.) can fail.

Using the example of an automobile, one example failure mode is a radiator leak. This failure mode has many possible consequences. For example, as a result of the radiator leak, the engine could overheat beyond a threshold temperature, resulting in a final outcome of a cracked engine block, causing the engine to no longer work. Another example consequence could be an engine heating causing a gas line to break, with a final outcome of an engine fire.

A failure mode may have an associated failure limit, which is a defined as a failure threshold that can occur if a failure mode is left untreated. For example, a failure limit may be a known engine temperature beyond which engine damage will occur. A FDS seeks to predict or provide notification of a failure mode, to give a system operator an opportunity to prevent a failure limit from occurring.

A signature is a basic failure building block that is indicative of a given failure mode. For example, signatures of a radiator leak failure mode could include loss of engine coolant, and could also include a gas line leak. Each signature may have an associated time-to-failure limit ("TTFL"), which is an elapsed time from an onset of the failure signature until a system reaches a failure limit.

It can be useful to compare different failure detection systems. For example, if a new FDS was very costly, a service provider of the FDS may wish to justify the increased cost of the FDS by demonstrating its improvement over a previous FDS. This improvement could be represented in the form of a risk reduction of the FDS. Equation 1, shown below, may be used to determine a risk reduction of a FDS.

$$R.R._{fraction} = \frac{FPMM\_reduced\_by\_FDS}{FPMM\_original} \quad \text{equation \#1}$$

where $R.R._{fraction}$ is a risk reduction fraction;

FPMM_reduced_by_FDS is a failure limit occurrence probability reduction (optionally measured in failures per million missions) after application of a selected failure detection system; and FPMM_original is failure limit occurrence probability reduction (optionally measured in failures per million missions) prior to application of the selected failure detection system;

FIG. 1 schematically illustrates a method 100 of determining a risk reduction of a failure detection system. The method 100 may be used to determine FPMM_reduced_by_FDS as shown in equation #1. The method 100 receives a plurality of failure modes for a system being analyzed (step 102). In one example the plurality of failure modes is received from an existing failure mode and effects analysis ("FMEA") system.

Of course, the failure modes may be received from other sources, or may be independently developed. The method 100 also receives a plurality of failure signatures (step 104). While it is understood that the method 100 could be performed with a single failure mode and a single failure signature, the method 100 will be described in relation to a plurality of failure modes and a plurality of failure signatures to provide an understanding of the wide applicability and scalability of the method 100.

A risk probability is determined for each of the plurality of failure modes (step 106). The risk probability corresponds to a likelihood that a selected failure mode will occur. In one example the probability is determined as a failure per million missions ("FPMM"), which is the failure probability of $10^{-6}$ per mission. Of course, other probability benchmarks could be used. Various sources of information may be used for this determination, such as historical data, engineering analysis, and test and field usage data. Engineering analysis data may include, for example, data from computer simulations. Thus, both historical data of actual failures and predicted data of future failures may be used in determining the FPMM risk probability.

A robust risk probability determination may include accounting for variations in a given system. Using the example of an engine, when the engine comes off an assembly line, there are often variations of engine characteristics between engines produced from the same assembly line. For example, dimensions, pump efficiency, duct resistance, etc. may vary from one engine to another due to a margin of error in manufacturing. This can make predicting engine performance and predicting engine failure challenging. To address this difficulty, computer software may be used to generate random values (e.g., engine efficiencies, engine resistances, etc.) within a predicted range of variation. These randomly generated values may be used to produce a predicted cluster of engine builds, which could include both high performing and low performing engines. This predicted cluster could then be used in the determination of step 106. In one example the Monte Carlo class of computational algorithms may be used to determine a predicted cluster of engine builds. Of course, other algorithms and computer-based software and simulations could be used.

A correlation ranking is determined for each of the plurality of failure signatures according to a scale (step 108). The correlation ranking corresponds to a likelihood that a given signature represents the at least one failure mode. In one example the scale is 0-5, with 5 corresponding to a strong correlation between the failure mode and signature, and 0 corresponding to no correlation between the failure mode and the signature. Of course, other scales and values could be used. Sources used in determining the correlation ranking could include, for example, historical data, engineering analysis and expert opinion.

Returning to the example failure mode of an automobile radiator failure, the signature of an engine overheating may be assigned a correlation value of "5" (high correlation to radiator failure), the signature of a gas line rupture may be assigned a ranking of "1" (low correlation to radiator failure), and a signature of loss of tire pressure may be assigned a rank of "0" (no correlation to radiator failure).

A failure mode risk probability is determined for each of the plurality of signatures for that failure mode (step 110). The risk probability compares comparing a ranking of a selected signature to a sum of all rankings for a failure mode, and may be calculated using equation #2 below.

$$FPMM_{i,j} = \frac{Rank *_j}{\sum_{m=1}^{m=n} Rank *_m} FPMM_i \qquad \text{equation \#2}$$

where
i is a failure mode number;
j is a signature number;
n is a quantity of signatures for the failure mode; and
$FPMM_{i,j}$ is a failure limit occurrence probability reduction for the given failure mode (see step 106).

As an example, assume that a automobile radiator failure is a first failure mode, and has a risk probability from step 106 of "10" ($FPMM_1$="10") Assume also that signature 1 has a correlation rank of 5, signature 2 has a correlation rank of 1, and signature 3 has a correlation rank of 0. The denominator in equation #2 would be 5+1+0=6 (sum of correlation rankings). Signature 1 would then be assigned a risk probability of $$\frac{5}{6} * 10 = 8.33 \ (FPMM_{1,1}),$$

signature 2 would be assigned a risk probability of $$\frac{1}{6} * 10 = 1.67 \ (FPMM_{1,2}),$$

and signature 3 would be assigned a risk probability of $$\frac{0}{6} * 10 = 0.0 \ (FPMM_{1,3}).$$

Adding the various risk probabilities would yield a failure mode 1 total risk probability of 8.33+1.67+00.0=10.0.

For each failure signatures having a non-zero correlation ranking, a distribution is determined (step 112) corresponding to a probability that the signature will occur at a given TTFL. The distribution is a failure probability density function ("f function"). The "f function" captures a tendency of a signature to occur slowly (large TTFL), or quickly (small TTFL). Each "f function" may be determined in response to historical data, engineering modeling, and engineering judgment, for example.

Figure 2A:
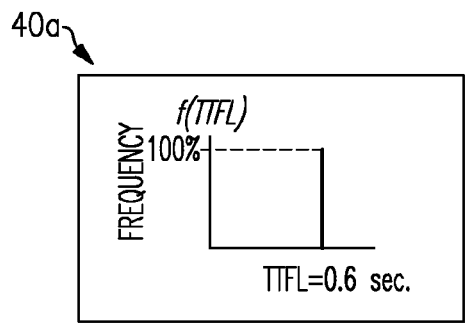
FIG. 2a schematically illustrates a first example failure probability density function.

FIG. 2a schematically illustrates a first example "f function" 40a in which all failures occur in 0.6 seconds (TTFL=0.6 seconds).

Figure 2B:
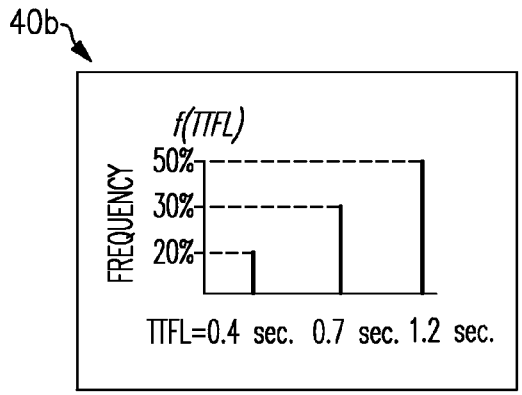
FIG. 2b schematically illustrates a second example failure probability density function.

FIG. 2b schematically illustrates a second example "f function" 40b in which 20% of all failures occur in 0.4 seconds (TTFL=0.4 seconds), 30% of all failures occur in 0.7 seconds (TTFL=0.7 seconds), and 50% of all failures occur in 1.2 seconds (TTFL=1.2 seconds). The sum of all percentages is 20%+30%+50%=100%.

Figure 2C:
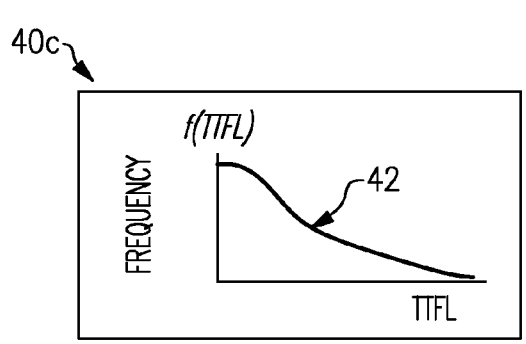
FIG. 2c schematically illustrates a third example failure probability density function.

FIG. 2c schematically illustrates a third example "f function" 40a which represents a continuous distribution curve 42 that is skewed to fast failures.

An effectiveness score, or "g function," corresponding to an ability to respond to each of the signatures to prevent a failure using a FDS as a function of TTFL is determined (step 114). Each "g function" may be determined in response to engineering modeling of a system, the FDS, and failure signatures over a range of TTFL values, for example. A "g function" is solely failure signature dependent, and is considered to be the same for all failure modes. In one example the "g function" values range from "0" in which a failure cannot be prevented (not effective at all) to "1" in which there is adequate time to prevent a failure (fully effective).

Figure 3:
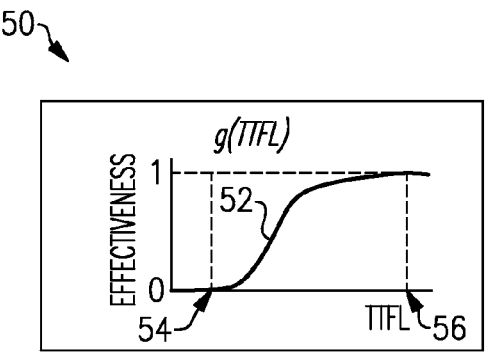
FIG. 3 schematically illustrates an effectiveness function.

FIG. 3 schematically illustrates a "g function" in a graph 50. In the graph 50, the "g function" corresponds to a continuous distribution curve 52. At a point 54 the failure signature is not effective at all, as it occurs so fast that failure cannot be prevented. However, at a point 56 it is completely effective, indicating that a failure occurs slowly and there is enough time to take action to prevent failure.

A failure limit occurrence probability reduction for each of the plurality of signatures is calculated (step 116) using equation #3 below:

$$F.L.O.P.R._{i,j} = \frac{FPMM_{ij}}{T} \int_0^T \frac{\int_0^{T-t} f_{ij}(TTF) g_j(TTF) dTTF}{\int_0^{T-t} f_{ij}(TFF) dTTF} dt \quad \text{equation \#3}$$

where i is a failure mode number;

j is a signature number;

T is a total mission duration;

t is a mission elapsed time; and

F.L.O.P.R.$_{i,j}$ is the probability that a failure mode would reach a failure limit for a selected failure mode and a selected failure signature in the system being analyzed but is mitigated by an FDS.

The FDS F.L.O.P.R. for a given TTFL is the product of "f functions" and "g functions" for that TTFL. For example, if the probability that the failure signature occurs at a TTFL of 0.1 seconds is f(0.1)=0.8 but the effectiveness at 0.1 seconds is g(0.1)=0.0, then there is insufficient time to react to the failure signature, the failure limit will be reached, and no risk reduction can be realized (0.8*0.0=0.0). Equation #3 takes into account the reduction in the TTFL range of interest as a mission proceeds. For example, for a mission duration of 520 seconds, the TTFL range of interest at the beginning of the mission is a range of 0.0-520.0 seconds since a failure can start at time=0.0 and fail right at the end of the mission (time=520). At mission time t, the TTFL range of interest is 520.0–t since any failures taking longer than 520.0–t will occur after the mission is over, and the only time of concern is during the mission. The calculation of equation #3 above assumes that the risk of failure is uniform throughout the mission. The denominator of equation #3 is a normalizing function, which ensures that the result of the integration $$\int_0^T$$

is in a range of 0-1.

Steps 106-116 may be selectively repeated for a plurality of failure modes (step 118).

A sum of failure limit occurrence probability reductions for all failure modes and signatures is calculated (step 120) to predict the overall failure limit occurrence probability reduction for the FDS, using equation #4 below.

$$F.L.O.P.R._{overall} = \sum_{i=1}^m \sum_{j=1}^n F.L.O.P._{i,j} \quad \text{equation \#4}$$

where m is a quantity of failure modes;

n is a quantity of signatures;

F.L.O.P.R.$_{overall}$ is a probability that a failure limit would be reached in the system being analyzed but is mitigated by a FDS.

Once the sum from step 120 is available, the sum may be compared to (e.g. divided by) an overall failure limit occurrence probability in the system being analyzed without implementation of the FDS to determine a FDS risk reduction fraction, as shown in equation #1 (step 122).

Referring again to the example of an automobile, assume that a failure probability before introducing an FDS is 100 FPMM, and assume that each "mission" is a 100 mile drive at 60 MPH. Failure modes may include radiator failure, tire failure, and transmission failure. Failure signatures may include engine heating, loss of power to wheels, and loss of ability to accelerate. A maximum TTFL of interest at the beginning of the mission is 100/600=1.67 hours, which decreases to zero at the end of the mission. Assuming introduction of an FDS reduces an overall risk by 50 FPMM (the sum of the contributions of all the signatures over all the failure modes), yielding a risk reduction of 50% (by using equation #1).

Figure 4:
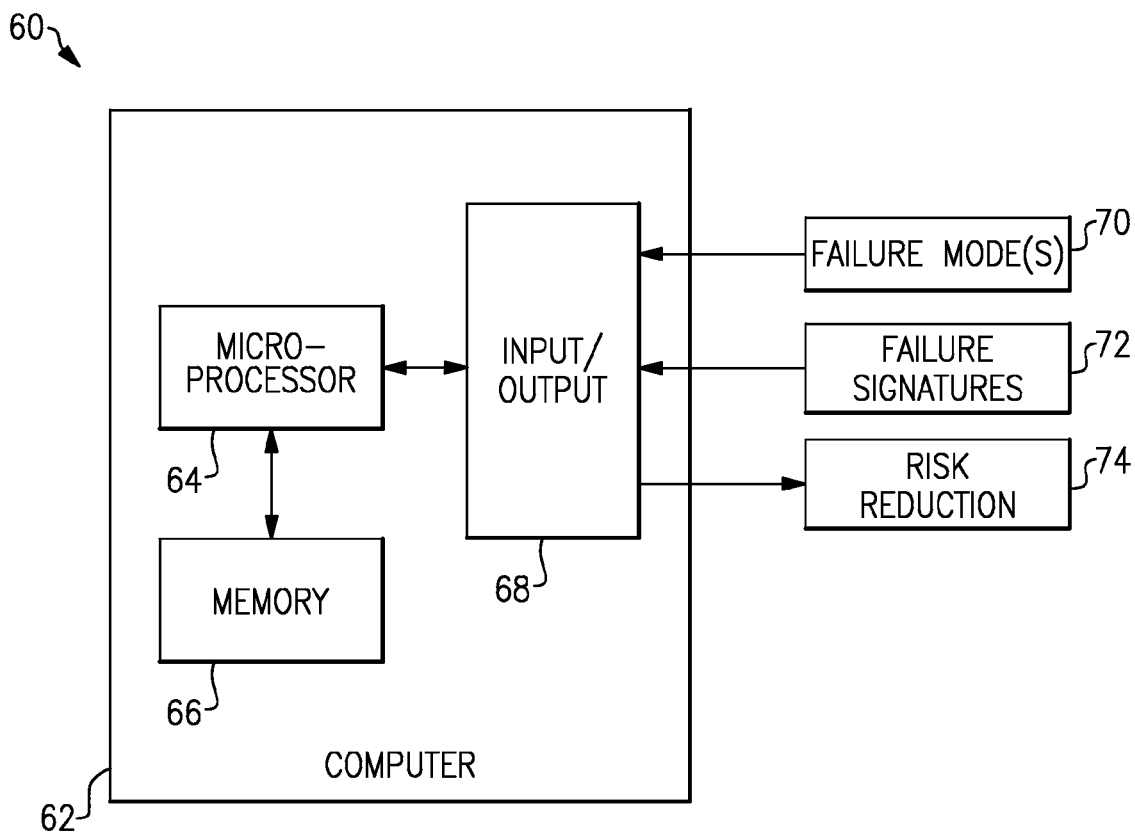
FIG. 4 schematically illustrates a computer-implemented system operable to perform the method of FIG. 1.

FIG. 4 schematically illustrates a computer-implemented system 60 operable to perform the method of FIG. 1. A computer 62 includes at least one microprocessor 64 in communication with storage 66 and in communication with an input/output module 68. The storage 66 could include memory, hard drives, or any electronic, optical, magnetic or another type of computer storage. The computer 61 is operable to receive at least one failure mode 70 and a plurality of failure signatures 72, and is operable to determine a risk reduction 74 in response to the data 70, 72 by performing the method 100.

While applications for an automobile have been described for the sake of simplicity of explanation, it is understood that in the disclosed embodiment the method 100 could be utilized in a FDS for other systems, such as gas turbine engines.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A process comprising:
    determining a probability of a failure mode of a system being analyzed reaching a failure limit as a function of time to failure limit;
    determining a probability of a mitigation of the failure mode as a function of a time to failure limit; and
    quantifying a risk reduction based on the probability of the failure mode of reaching the failure limit and the probability of the mitigation.

2. A process comprising:
    determining a probability of a failure mode of a system being analyzed reaching a failure limit as a function of time to failure limit;
    determining a probability of a mitigation of the failure mode as a function of a time to failure limit; and quantifying a risk reduction based on the probability of the failure mode of reaching the failure limit and the probability of the mitigation,
wherein said step of determining a probability of a failure of a system being analyzed as a function of time to failure limit includes:
  a) determining a risk probability for at least one failure mode, the risk probability corresponding to a likelihood that the at least one failure mode will occur in the system being analyzed;
  b) determining a correlation ranking for at least one failure signature, the correlation ranking corresponding to a likelihood that the at least one failure signature represents the at least one failure mode;
  c) determining a failure mode risk probability for the at least one failure signature comparing the correlation ranking of the at least one failure signature to a sum of all correlation rankings for a signature set, the signature set including at least the at least one failure signature; and
  d) determining a distribution corresponding to a probability that the at least one failure signature will occur at a given time to failure limit in the system being analyzed.

3. The method of claim 2, wherein said step (a) is performed in response to historical data of actual failures, predicted data of future failures, or both.

4. The method of claim 2, wherein said step (a) includes:
predicting a cluster of systems being analyzed;
determining a probability that the failure mode will occur in each system in the cluster; and
averaging the probabilities to determine an overall probability that the failure mode will occur in the system being analyzed.

5. The system of claim 2, wherein the correlation ranking of said step (b) is in a range from 0-5.

6. The method of claim 2, wherein said step (d) is only performed for a selected failure signature if the selected failure signature has a non-zero correlation ranking.

7. The method of claim 2, wherein the system being analyzed is a machine or a process.

8. The method of claim 2, wherein said step of determining a probability of a mitigation of the failure as a function of a time to failure limit includes:
  e) determining an effectiveness score corresponding to an ability to respond to the at least one failure signature using a failure detection system to prevent the at least one failure mode from reaching a failure limit in the system being analyzed as a function of time to failure limit.

9. The method of claim 8, wherein said step of quantifying a risk reduction based on the probability of the failure and the probability of the mitigation includes:
  f) calculating a failure limit occurrence probability reductions for the at least one signature in response to the effectiveness score;
  g) calculating a sum of failure limit occurrence probability reductions from said step (f) for each signature in the signature set; and
  h) comparing the sum of failure limit occurrence probability reductions for the failure detection system to a sum of overall failure limit occurrence probabilities in the system being analyzed without implementation of the failure detection system to determine a risk reduction fraction of the failure detection system.

10. The method of claim 9, wherein said step (f) includes integrating on the computer a product of a function corresponding to the distribution of said step (d) and a function corresponding to the effectiveness score of said step (e).

11. The method of claim 9, wherein the failure detection system is a first failure detection system, and wherein said step (h) includes dividing the sum of failure limit occurrence probabilities for the first failure detection system by a sum of failure limit occurrence probabilities for a second failure detection system.

12. The method of claim 8, wherein said step of determining a probability of a mitigation of the failure as a function of a time to failure limit includes:
  f) calculating a failure limit occurrence probability reduction for the at least one signature in response to the effectiveness score;
  g) selectively repeating steps (a)-(f) for a plurality of failure modes;
  h) calculating a sum of failure limit occurrence probability reductions from said step (g) for each signature in the signature set; and
  i) comparing the sum of failure limit occurrence probability reductions for the failure detection system to a sum of overall failure limit occurrence probabilities in the system being analyzed without implementation of the failure detection system to determine a risk reduction of the failure detection system.

13. A computer-implemented system, comprising:
a storage module storing at least one failure mode for a system being analyzed; and
a microprocessor, the microprocessor being operable to determine a probability of the at least one failure mode of the system being analyzed reaching a failure limit as a function of time to failure limit, determine a probability of a mitigation of the failure mode as a function of a time to failure limit, and quantify a risk reduction based on the probability of the failure mode reaching the failure limit and the probability of the mitigation.

14. The system of claim 13, wherein an input/output module is also operable to receive a plurality of failure signatures, and to output the risk reduction.

15. A computer-implemented system, comprising:
a storage module storing at least one failure mode for a system being analyzed;
a microprocessor, the microprocessor being operable to determine a probability of the at least one failure mode of the system being analyzed reaching a failure limit as a function of time to failure limit, determine a probability of a mitigation of the failure mode as a function of a time to failure limit, and quantify a risk reduction based on the probability of the failure mode reaching the failure limit and the probability of the mitigation; and
an input/output module operable to receive a plurality of failure signatures, and to output the risk reduction,
wherein the microprocessor determines a probability of a failure of a system being analyzed as a function of time to failure limit by determining a risk probability for at least one failure mode, determining a correlation ranking for at least one failure signature, determining a failure mode risk probability for the at least one failure signature comparing the correlation ranking of the at least one failure signature to a sum of all correlation rankings for a signature set, and determining a distribution corresponding to a probability that the at least one failure signature will occur at a given time to failure limit in the system being analyzed.

16. The system of claim 15, wherein the microprocessor determines a probability of a mitigation of the failure as a function of a time to failure limit by determining an effectiveness score corresponding to an ability to respond to the at least one failure signature using a failure detection system to prevent the at least one failure mode from reaching a failure limit in the system being analyzed as a function of time to failure limit.

17. The system of claim 16, wherein the microprocessor quantifies a risk reduction based on the probability of the failure and the probability of the mitigation by calculating a failure limit occurrence probability reduction for the at least one signature in response to the effectiveness score, calculating a sum of failure limit occurrence probability reductions for each signature in the signature set, and comparing the sum of failure limit occurrence probability reductions for the failure detection system to a sum of overall failure limit occurrence probabilities in the system being analyzed without implementation of the failure detection system to determine a risk reduction of the failure detection system.

* * * * *